United States Patent [19]

Kinaga et al.

[11] Patent Number: 4,700,983
[45] Date of Patent: * Oct. 20, 1987

[54] CONSTRUCTION OF BODY OF MOTOR VEHICLE

[75] Inventors: Eiichi Kinaga, Toyota; Daiichi Shiraishi, Seto, both of Japan

[73] Assignee: Toyota Jidosha Kabushiki Kaisha, Aichi, Japan

[*] Notice: The portion of the term of this patent subsequent to May 19, 2004 has been disclaimed.

[21] Appl. No.: 793,154

[22] Filed: Oct. 31, 1985

[30] Foreign Application Priority Data

Nov. 2, 1984 [JP] Japan ............................ 59-167012[U]

[51] Int. Cl.⁴ ......................... E05F 1/08; E05D 15/32
[52] U.S. Cl. ..................................... 296/146; 16/288; 16/308; 16/370
[58] Field of Search ............... 296/146, 185, 187, 193, 296/194; 16/288, 297, 308, 334, 370

[56] References Cited

U.S. PATENT DOCUMENTS

| | | | |
|---|---|---|---|
| 2,008,256 | 7/1935 | Lefevre | 16/370 |
| 2,948,917 | 8/1960 | Campbell et al. | 16/308 X |
| 3,206,186 | 9/1965 | Thomas | 49/272 |
| 3,339,226 | 9/1967 | Brown | 16/288 |
| 3,427,682 | 2/1969 | Bachmann | 16/308 X |
| 3,758,990 | 9/1973 | Balanos | 49/153 |
| 3,889,316 | 6/1975 | Koike | 16/297 |
| 3,969,789 | 7/1976 | Wize | 16/334 X |
| 4,474,402 | 10/1984 | Shelton | 49/498 X |
| 4,502,182 | 3/1985 | Lautenschlager et al. | 16/288 |

FOREIGN PATENT DOCUMENTS

| | | |
|---|---|---|
| 126438 | 11/1984 | European Pat. Off. . |
| 135114 | 3/1985 | European Pat. Off. . |
| 135929 | 4/1985 | European Pat. Off. . |
| 136714 | 4/1985 | European Pat. Off. . |
| 0140245 | 5/1985 | European Pat. Off. ............ 16/288 |
| 1075958 | 2/1960 | Fed. Rep. of Germany . |
| 3223938 | 12/1983 | Fed. Rep. of Germany . |
| 1285896 | 1/1962 | France . |
| 2542796 | 9/1984 | France . |
| 46014 | 6/1982 | Japan . |
| 58-36767 | 8/1983 | Japan . |
| 60-31474 | 4/1985 | Japan . |
| 60-64122 | 5/1985 | Japan .. |
| 447734 | 5/1936 | United Kingdom . |
| 462033 | 3/1937 | United Kingdom . |

Primary Examiner—Robert B. Reeves
Assistant Examiner—Russell D. Stormer
Attorney, Agent, or Firm—Parkhurst & Oliff

[57] ABSTRACT

A door hinge mechanism and associated body of a motor vehicle is disclosed. The hinge mechanism has rotary center shafts supported on an end panel on the pivoting (rocking proximal) end of a side door, and rotary center shafts supported on a surface on the vehicle body adjacent the end panel. A first arm is rotatably connected at its opposite ends to a rotary center shaft on the vehicle body and to another rotary center shaft on the end panel of the door. A second arm is rotatably connected at its opposite ends to a rotary center shaft on the vehicle body and to a rotary center shaft on the door. A forward end corner portion of the end panel of the side door is raised forward on the compartment side of the vehicle body from the rear surface of the end panel where the side door hinge is secured. The raised portion of this configuration is attached to a weather strip mount. A weather strip attached thereto, comes into pressed contact with a weather strip contact surface on the vehicle body when the side door is fully closed.

20 Claims, 19 Drawing Figures

FIG. 14
FIG. 13
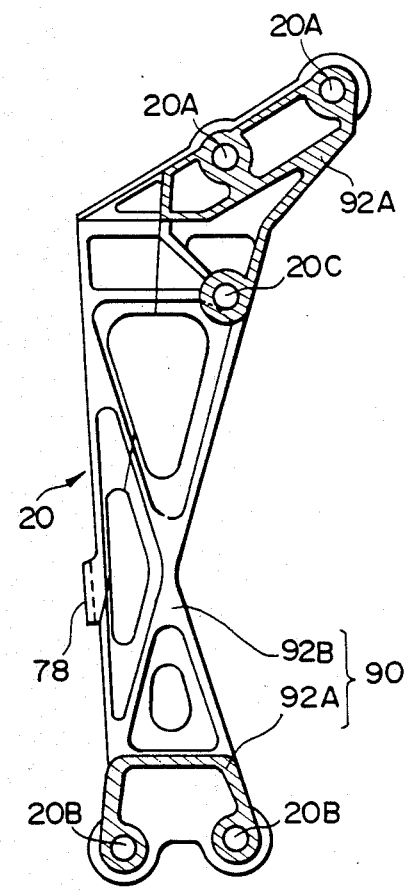
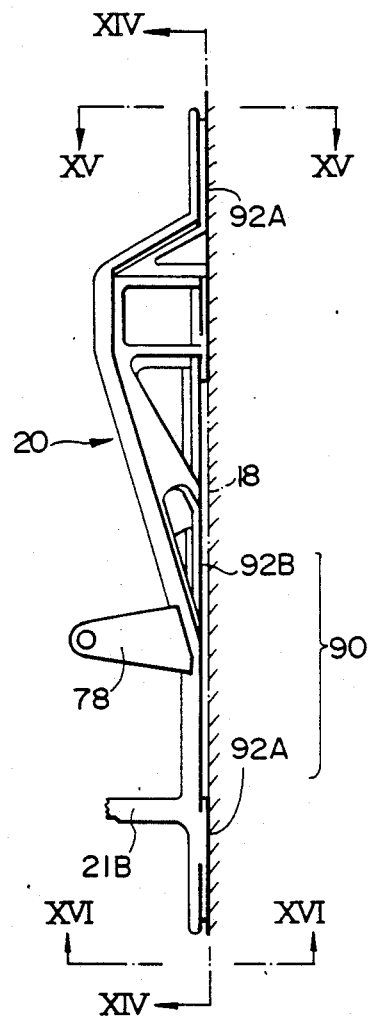

CONSTRUCTION OF BODY OF MOTOR VEHICLE

BACKGROUND OF THE INVENTION

1. Field of the Invention

This invention relates to improvements in a construction of a body of motor vehicle, having a side door hinge mechanism utilizing quadric rotary link devices.

2. Description of the Related Art

In most cases, the side door in a motor vehicle, e.g. passenger car has heretofore been installed in a manner to be rotatable about a hinge affixed to a vehicle body for opening or closing. In order to allow an occupant of the motor vehicle to open or close the side door for getting in or out of the motor vehicle, a door opening angle commensurate to the total length of the side door is required. At this time, when a space outwardly of the motor vehicle is small, there are many cases where it is difficult for the occupant to get in or out of the vehicle because the side door cannot be opened sufficiently.

In contrast thereto, as disclosed in Japanese Utility Model Laid-Open (Kokai) No. 46014/1982 or 101263/1980 for example, there has been proposed a side door hinge mechanism through the utilization of a quadric rotary link mechanism, wherein the quadric rotary link mechanism comprises: a rotary link interconnecting a point on a body of vehicle and another point on a side door as rotary centers out of two points spaced apart from each other on the body and two points spaced apart from each other on the side door; another rotary link interconnecting the other point on the body and the other point on the side door as being centers; a portion between the two rotary centers on the body; and another portion between the two rotary centers on the side door.

The side door hinge mechanism utilizing the above-described quadric rotary link mechanism makes it possible for the occupant to reduce the necessary space outwardly of the motor vehicle while securing a space at his feet. In consequence, even when the space outwardly of the motor vehicle is small, the occupant can get in or out of the motor vehicle by opening or closing the side door.

In the motor vehicle mounted thereto with the above-described side door hinge mechanism utilizing the quadric rotary link devices, since the rocking locus of the side door is different from that of the conventional door hinge, such a disadvantage is presented that, with the conventional mounting mode, the weather strip for contacting the side door and the vehicle body to seal a space formed therebetween when the side door is fully closed cannot perform the sealing perfectly.

Furthermore, when the above-described side door hinge mechanism is interposed in a space formed between the end panel on the side of the rocking proximal end of the side door and the vehicle body, e.g. the front pillar, in order to secure the space, the position of the end panel in the longitudinal direction of the vehicle body should be shifted rearwardly in the vehicle body from the center of the hinge as compared with the case of the conventional door hinge.

For this end, also the position of the forward end of the opening portion of the vehicle body should be shifted rearwardly in the vehicle body as compared with the case of the conventional opening portion, thus presenting the disadvantage of that the getting in and out properties of the vehicle for occupants are lowered.

SUMMARY OF THE INVENTION

It is therefore the primary object of the present invention to provide a construction of a body of motor vehicle, wherein a weather strip can be provided to perform the sealing perfectly in association with the rocking locus of the side door, obtained by the side door hinge utilizing the quadric rotary link devices, without shifting the position of the forward end of the opening of the vehicle body rearwardly in the vehicle body.

To this end, the present invention contemplates that a construction of a body of motor vehicle, having a side door hinge mechanism comprising:

rotary center shafts on the side of a side door, supported at two positions spaced apart from each other in the generally horizontal direction on an end panel on the side of a rocking proximal end of the side door;

rotary center shafts on the side of a vehicle body, supported at two positions spaced apart from each other in the generally horizontal direction on a surface on the side of the vehicle body, adjacent said end panel;

a first arm rotatably connected at opposite ends thereof to one of the rotary center shafts on the side of the vehicle body and one of the rotary center shafts on the side of the side door; and a second arm rotatably connected at opposite ends thereof to the other of the rotary center shafts on the side of the vehicle body and the other of the rotary center shafts on the side of the side door; wherein a forward end corner portion of said end panel of the side door on the side of the compartment is raised more forwardly in the vehicle body than the rear end of a surface of the end panel, where a side door hinge is secured, to thereby provide a raised portion;

said raised portion is secured thereto with a weather strip, with which a weather strip contact surface on the side of the vehicle body comes into pressing contact in the widthwise direction of the vehicle body when the side door is fully closed.

To the above end, the present invention contemplates that said weather strip contact surface on the side of the vehicle body and the rear end of an opening portion on the side of the vehicle body contiguous to said contact surface are shifted forward in the vehicle body as opposed to the position of said raised portion of the side door.

To the above end, the present invention contemplates that said weather strip contact surface is formed on an outside surface of a front pillar at a rear end thereof.

To the above end, the present invention contemplates that said weather strip contact surface is formed on a recess at an outside and rearside corner of the front pillar.

To the above end, the present invention contemplates that an inner panel and an outer panel in the side door are extended along the outer surface of the side door, further forwardly from the end panel, to thereby form an extension, the extension is extended forwardly within a scope not interfering with a front side fender when the door is opened, the forward end of the extension in the longitudinal direction of the vehicle body is disposed outwardly of the rotary center shaft on the side of the vehicle body located at the foremost position, and positioned close to the forward end of the front pillar, whereby a space for receiving the side door hinge is formed between the outer surface of the front pillar and the extension.

To the above end, the present invention contemplates that said weather strip is secured to a weather strip mount which is formed a generally L-shaped at the raised portion.

According to the present invention, the forward end corner portion of the end panel of the side door on the side of the compartment is raised more forwardly than the rear end of the surface of the end panel, where the side door hinge is secured, in association with this, the rear end of the opening portion of the vehicle body is shifted forwardly, whereby the getting on and off properties of the vehicle for the occupants is improved, the weather strip is compressed in the widthwise direction of the vehicle body when the door is fully closed to be associated with the opening-closing locus of the side door, so that the weather strip can reliably seal the space formed between the side door and the vehicle body.

BRIEF DESCRIPTION OF THE DRAWINGS

FIG. 13 is a side view showing the mounted state of the body side base in the above embodiment;

FIGS. 14 to 16 are views in the directions indicated by the arrows from lines XIV—XIV to XVI—XVI in FIG. 13;

DETAILED DESCRIPTION OF THE PREFERRED EMBODIMENT

Figure 1:
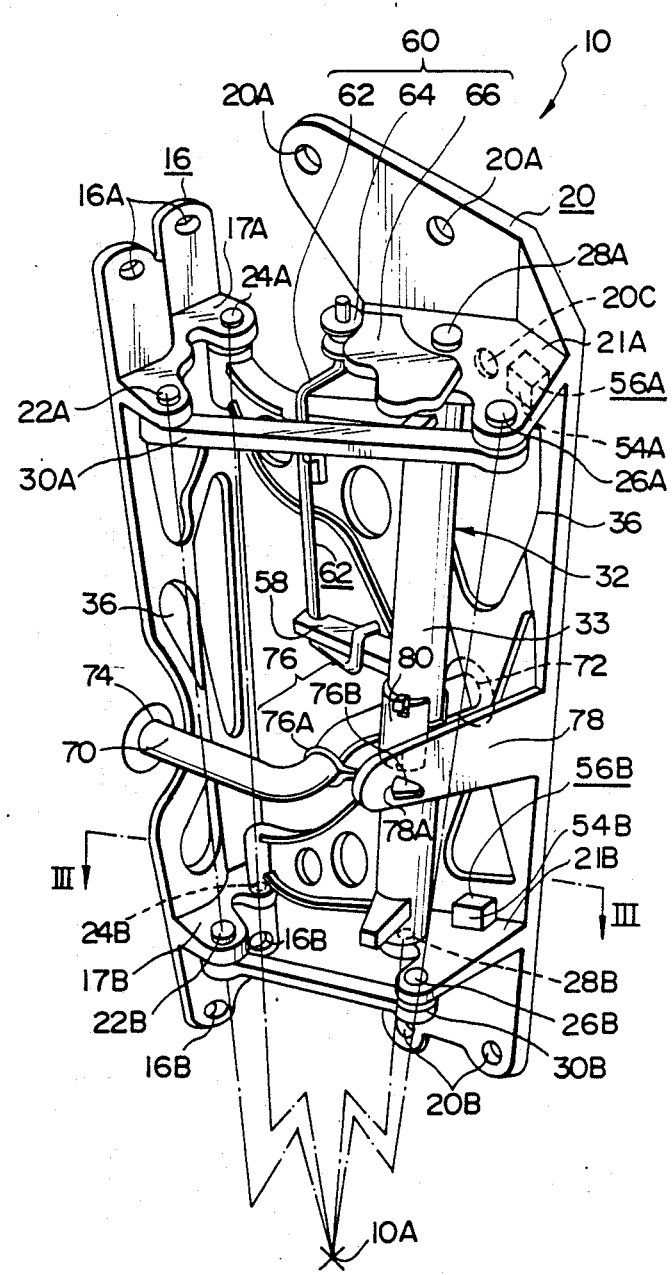
FIG. 1 is a perspective veiw showing one embodiment of the side door hinge mechanism in a motor vehicle according to the present invention.

Description will hereunder be given of one embodiment of the present invention with reference to the drawings.

As shown in FIGS. 1 to 4, in this embodiment, a side door hinge 10 in a motor vehicle, comprises:

a door side base 16 formed long in the vertical direction along an end panel 14 as being an end portion on the side of a rocking proximal end of a side door 12 of a motor vehicle (not shown generally) and secured to the end panel 14;

a body side base 20 formed long in the vertical direction along a surface 18A of a front pillar 18 on the body adjacent the end panel 14 and secured to the surface 18A;

four top rotary center shafts 22A, 24A, 26A and 28A and four bottom rotary center shafts 22B, 24B, 26B and 28B aligned with the top rotary center shafts 22A, 24A, 26A and 28A and positioned downwardly thereof, the top center shafts and the bottom center shafts being supported at least at two pairs of positions in the top portions and the bottom portions of the door side base 16 and the body side base 20;

a top control arm 30A rotatably connected at opposite ends thereof to the top rotary center shafts 22A and 26A on the outer side in the vehicle widthwise direction of the door side base 16 and the body side base 20 out of the top rotary center shafts 22A, 24A, 26A and 28A;

a bottom control arm 30B rotatably connected at opposite ends thereof to the bottom rotary center shafts 22B and 26B which are aligned with the top rotary center shafts 22A and 26B at the opposite ends of the top control arm 30A; and a main arm 32 formed integrally in the vertical direction and rotatably connected at opposite ends in the vertical and widthwise directions thereof to the top rotary center shafts 24A and 28A and the bottom rotary center shafts 24B and 28B on the other side.

Figure 2:
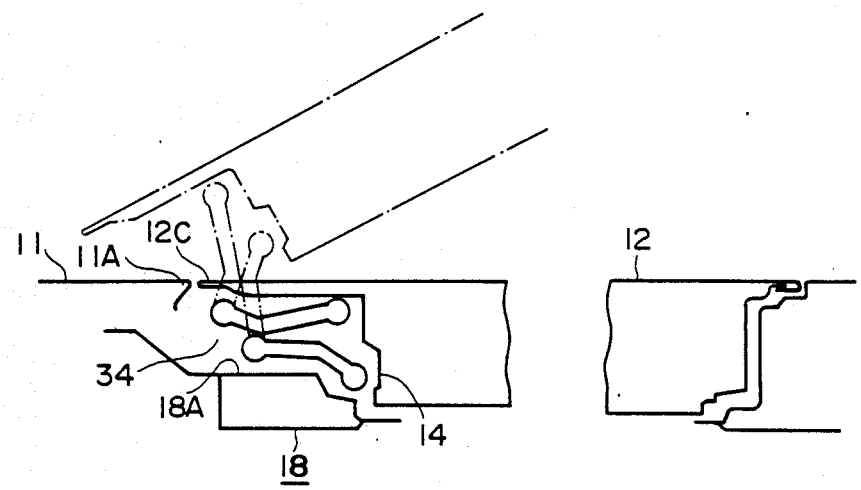
FIG. 2 is a schematic sectional view showing the positional relationship between the front pillar and the side door, to the both of which is secured the side door hinge according to the above embodiment.
Figure 3:
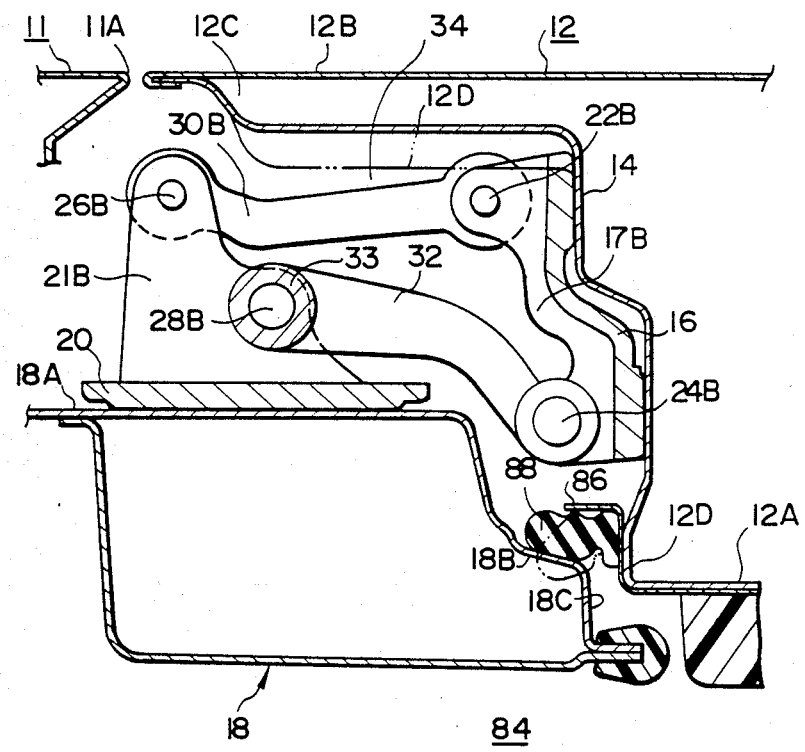
FIG. 3 is a sectional view enlargedly showing the essential portions of FIG. 2.

Here, as shown in FIGS. 2 and 3, an inner panel 12A and an outer panel 12B in the side door 12 are extended along the outer surface of the side door 12, further forward from the end panel 14, to thereby form an extension 12C. This extension 12C is extended forwardly within a scope not interfering with a front side fender 11 when the door is opened. The forward end of the extension 12C in the longitudinal direction of the vehicle body is disposed outwardly of the top rotary center shaft 26A located at the foremost position, and positioned close to the forward end of the front pillar 18, whereby a space 34 for receiving the side door hinge 10 is formed between the outer surface 18A of the front pillar 18 and the extension 12.

Furthermore, the extension 12C is formed into a thick width portion 12D expanded inwardly in the direction of the door thickness at a position in the vertical direction between the top control arm 30A and the bottom control arm 30B, which are disposed outwardly in the widthwise direction of the vehicle body.

The portion of the extension 12C at the position outwardly of the top and bottom control arms 30A and 30B is formed into a thin plate shape so as not to interfere with these control arms.

Here, as shown in FIG. 3, the corner portion at the forward end of the inner panel 12A of the side door 12 on the inboard side projects forwardly from the rear end surface of the door side base 16 on the side of a compartment 84 at a position inside the end panel 14 in the widthwise direction of the vehicle body, i.e. at a position inwardly of the side door hinge 10 in the widthwise direction of the vehicle body and forms a generally L-shaped weather strip mount 86 at a projecting portion 12D.

A door weather strip 88 is secured to this weather strip mount 86.

On the other hand, a weather strip contacting surface 18B of the front pillar 18, opposed to the door weather strip 88 is formed at a position shifted from the surface 18A toward the compartment 84, whereby the weather strip contacting surface 18B comes into contact with the surface of the door weather strip 88 on the side of the compartment 84 when the side door 12 is fully closed.

Further, a recess is formed at the corner portion at the outer and rearward of the front pillar 18, said weather strip is formed on the recess.

In this case, the longitudinal position of the corner portion of the weather strip contacting surface 18B, i.e. the rear end face 18C of the front pillar 18 is shifted forwardly as compared with the normal case corresponding with the longitudinal position of the weather strip mount 86.

The main arm 32 is disposed inwardly of the top control arm 30A and the bottom control arm 30B in the widthwise direction of the vehicle body, and, in plan view, is disposed in a manner to be outwardly convexed and along the rear outer side angle portion and the surface 18A of the front pillar 18 when the side door 12 is closed.

In other words, when the side door 12 is fully closed, the main arm 32 disposed inwardly in the widthwise direction of the vehicle body can be housed without interfering with the front pillar 18, and yet, being disposed as close as possible to the front pillar 18.

On the other hand, the top control arm 30A and the bottom control arm 30B, both of which are disposed outwardly of the main arm 32 in the widthwise direction of the vehicle body, are bent in a manner to be slightly convexed inwardly in the widthwise direction of the vehicle body, so that the both control arms 30A, 30B can avoid interfering with a rear end portion 11A of the front side fender 11 when the side door 12 is fully opened and the side door 12 when fully opened can slide as forwardly from the vehicle body as possible.

The door side base 16 is formed into a generally crank-shape in horizontal section, following the form of the end panel 14 of the side door 12. The door side base 16 is tightened and fixed to the end panel 14 through bolts, not shown, penetrating through bolt holes 16A and 16B which are formed at two positions at the top end portion and at two positions at the bottom end portion thereof.

The top rotary center shafts 22A and 24A are generally vertically secured to and supported by a bearing supporting portion 17A horizontally extended from a position close to and downwardly shifted from the top bolt holes 16A of the door side base 16.

The bottom rotary center shafts 22B and 24B are generally vertically supported by a bearing supporting portion 17B horizontally extended from a position close to and upwardly shifted from the bottom bolt holes 16B of the door side base 16.

The body side base 20 is formed with two bolt holes 20A at the top portion thereof, two bolt holes 20B at the bottom portion thereof and a bolt hole 20C close to and downwardly of the top bolt holes 20A. The body side base 20 is tightened and fixed to the surface 18A disposed outwardly of the front pillar 18 in the widthwise direction of the vehicle body through bolts, not shown, inserted through the bolt holes 20A, 20B and 20C.

Here, the upper half portion of the body side base 20 is bent to have an obtuse angle in its horizontal section, so that the rigidity in section can be increased.

The top rotary center shafts 26A and 28A are generally vertically supported by a bearing supporting portion 21A horizontally extended from a position disposed upwardly of the bolt hole 20C of the body side base 20 and close to an shifted downwardly from the top bolt holes 20A of the body side base 20.

Formed at a position close to and upwardly shifted from the bottom bolt holes 20B of the body side base 20 is a bearing supporting portion 21B horizontally extended, and this bearing supporting portion 21B is adapted to generally vertically support the bottom rotary center shafts 26B and 28B.

Relative to the top rotary center shafts 22A, 24A, 26A and 28A, the bottom rotary center shafts 22B, 24B, 26B and 28B are aligned on inclined axes slightly inclined from the vertical axis, so that the bottom center shafts can intersect the top center shafts at a hypothetical point 10A disposed downwardly of the side hinge 10.

Designated at 36 show lightening holes formed to lighten the weights in the door side base 16 and the body side base 20, respectively.

The top and bottom control arms 30A and 30B, being small in diameter, mainly bear the excessively opening load of the side door 12 and the torsional load, prevent the side door 12 from being distorted due to a gravitational moment and an excessive load of the side door 12, and further, control the rockering locus of the side door 12, whereas, the main arm 32 mainly support the weight of the side door 12.

Figure 4:
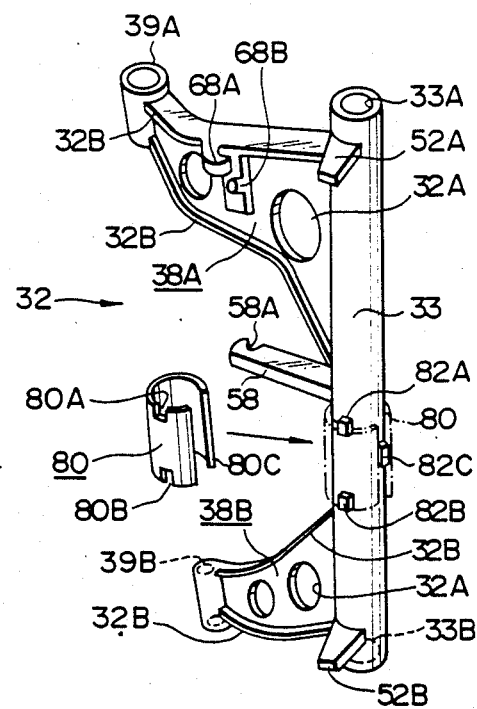
FIG. 4 is a disassembled perspective view showing the main arm and the harness protector in the above embodiment.

As shown in FIG. 4, the main arm 32 is formed into a generally K-shape. A vertical side portion of the K-shape is formed to provided a large-diameter pipe portion 33 which is coupled at a top coupling hole 33A thereof onto the top rotary center shaft 28A on the body's side, and further, coupled at a bottom coupling hole 33B threrof onto the bottom rotary center shaft 28B on the body's side. A top side portion of the K-shape is formed to provide a generally triangular top arm 38A having a horizontal upper side edge and an inclined lower side edge, a coupling hole 39A at the forward end of which is coupled onto the top rotary center shaft 24A on the door side base 16. A bottom side portion of the K-shape is formed to provide a generally triangular bottom arm 38B having an inclined upper side edge and a horizontal lower side edge, a coupling hole 39B at the forward end of which is coupled onto the bottom rotary shaft 24B on the door side base 16. A vertical space is formed between the portions of the top arm 38A and of the bottom arm 38B to the pipe portion 33. The top arm 38A, being longer than the bottom arm 38B in the vertical direction, i.e. larger than the bottom arm 38B in the longitudinal section, mainly bears the load of the side door 12.

Designated at 32A are lightening holes formed to lighten the weights in the top arm 38A and the bottom arm 38B, and 32B reinforcing ribs formed along the upper end edge and the lower end edge of the top arm 38A and the bottom arm 38B in a manner to project in the widthwise directions of the plates.

Figure 5:
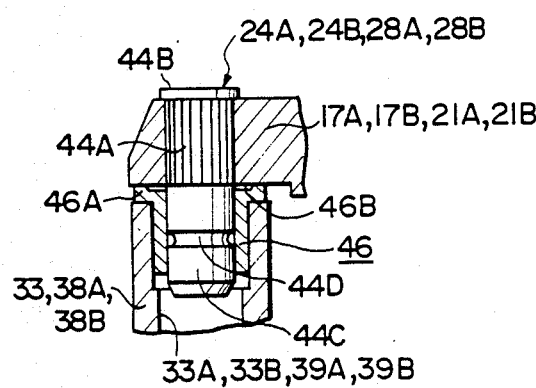
FIG. 5 is a sectional view showing the mounted state of the rotary center shaft of the main arm in the above embodiment.

As shown in FIG. 5, the top rotary center shafts 24A, 28A and the bottom rotary center shafts 24B, 28B for supporting the main arm 32 are cantilever pins each including a serrated shafts 44A inserted from above or below into each of the bearing supporting portions 17A, 21A, 17B and 21B which are opposed to the top and bottom rotary center shafts, a collar 44B and an insertion portion 44C.

Figure 6:
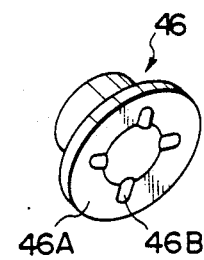
FIG. 6 is a perspective view showing the bush coupled to the rotary center shaft shown in FIG. 5.

Press-fitted into each of the coupling holes 33A, 33B, 39A and 39B is a bush 46 having a collar 46A and being inserted from the outer end of the coupling holes (Refer to FIG. 6). Inserted through this bush 46 is the insertion portion 44C at the forward end of the cantilever-shaped top rotary center shafts 24A, 28A or bottom rotary center shafts 24B, 28B.

The insertion portion 44C inserted into the bush 46 of each of the top rotary center shafts 24A, 28A and the bottom rotary center shafts 24B, 28B is formed with an oil groove 44D in the circumferential direction thereof, and lubricating oil is filled in the oil groove 44D.

A portion on the outer end face of the collar 46A of the bush 46, being contiguous to the outer periphery of the insertion portion 44C, is formed with four oil grooves 46B in the radial directions and at equal angular intervals in the circumferential direction (Refer to FIG. 6).

Figure 7:
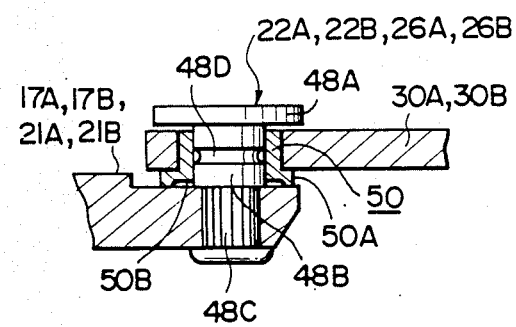
FIG. 7 is a sectional view showing the mounted state of the rotary center shaft on the side of the control arm in the above embodiment.

As shown in FIG. 7, the top rotary center shafts 22A, 26A and the bottom rotary center shafts 22B, 26B for supporting the top control arm 30A and the bottom control arm 30B are cantilever pins each including a collar 48A, an insertion portion 48B and a serrated shaft 48C.

A bush 50 having a collar 50A is press-fitted into each of opposite ends of the top control arm 30A and the bottom control arm 30B from the sides of the bearing supporting portion 17A, 21A, 17B or 21B.

The top rotary center shafts 22A, 26A and the bottom rotary center shafts 22B, 26B are each inserted at the insertion portion 48B thereof into the bush 50, the serrated shaft 48C thereof is press-fitted into each of the bearing supporting portions 17A, 21A, 17B and 21B, which is clinched by the forward end of the serrated shaft 48C and affixed.

The outer periphery of the insertion portion 48B is formed with an oil groove 48D in the circumferential direction, the outer end face of the collar 50A of the bush 50 is formed with four oil grooves 50B in the radial directions from the inner periphery, and lubricating oil is filled in all of these oil grooves 50B.

Formed at the top end portion and the bottom end portion of the pipe portion 33 of the main arm 32 are stoppers 52A and 52B which project horizontally.

Provided on the body side base 20 in opposed relationship to these stoppers 52A and 52B are protrusions 56A and 56B which are formed with stopper surfaces 54A and 54B, respectively, for abutting against the stoppers 52A and 52B at the time of full opening of the side door 12 to regulate the fully opened position of the side door 12.

The protrusion 56A protrudes at a corner portion between the bottom face of the bearing supporting portion 21A and the inner surface of the body side base 20, and the protrusion 56B protrudes at a corner portion between the top face of the bearing supporting portion 21B and the inner surfce of the body side base 20.

A door check mechanism 60 is formed between a torsion bar hook 58 horizontally projection from a generally central position in the vertical direction of the pipe portion 33 of the main arm 32 and the bearing supporting portion 21A of the body side base 20.

This door check mechanism 60 is constituted by a torsion bar 62, a roller 64 and a cam plate 66.

Figure 8:
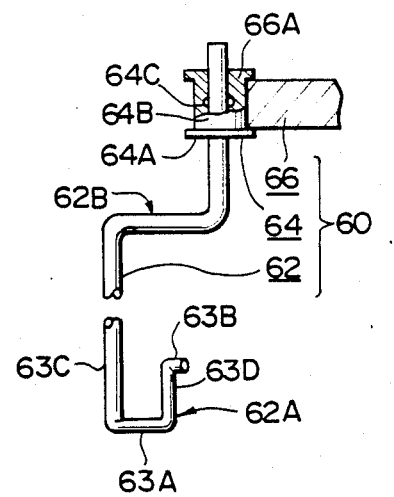
FIG. 8 is a sectional view showing the essential portions of the door check mechanism in the above embodiment.
Figure 9:
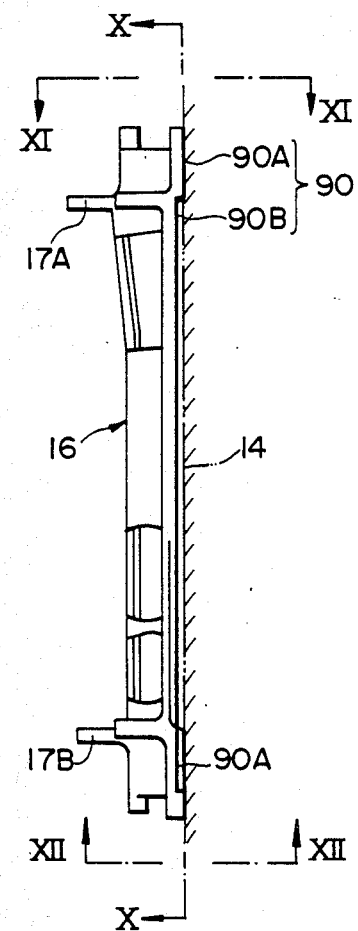
FIG. 9 is a side view showing the mounted state of the door side arm in the above embodiment.
Figure 10:
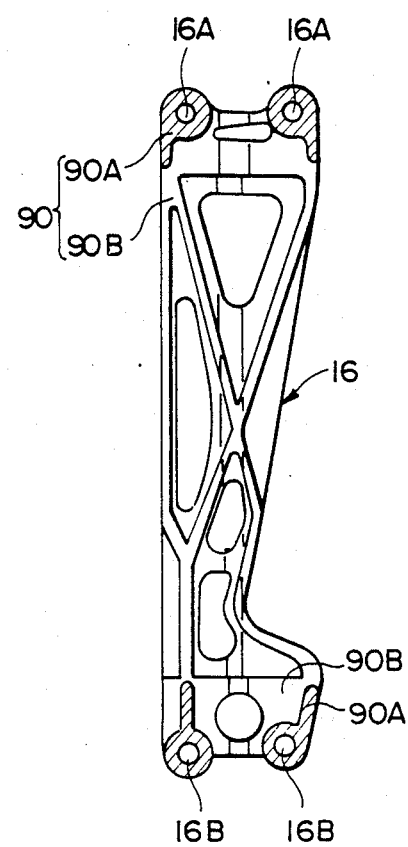
FIGS. 10 to 12 are views in the directions indicated by the arrows from lines X—X to XII—XII in FIG. 9.

As shown in FIGS. 1 and 8, the torsion bar 62 is provided at the bottom end thereof with a generally U-shaped wind-in form portion 62A, the forward end of which is bent at a right angle, and the torsion bar hook 58 of the pipe portion 33 is clamped by two axes including a bottom side 63A of the U-shape and the rectangularly bent portion 63B from above and below so as to position the torsion bar hook 58 in its axial direction. Furthermore, the torsion bar hook 58 is clamped by two axis portions 63C and 63D in the lateral direction so as to position the torsion bar hook 58 in the rotating direction.

The top end portion of the torsion bar 62 is formed into a crank-shaped portion 62B and the roller 64 is rotatably and axially slidably coupled onto the crank-shaped portion 62B from above.

In FIG. 4, designated at 58A is a recess for positioning the rotating direction of the torsion bar 62, being formed in the torsion bar hook 58, and 68A and 68B positioning projections formed on the top arm 38A of the main arm 32, for clamping therebetween the torsion bar 32.

The cam plate 66 is a flat plate-shaped member secured to a portion of the top surface of the bearing supporting portion 21A, which is opposed to the door side base 16, and a cam surface 66A of the cam plate 66 in parallel to the center axis of the pipe portion 33.

The lift of the cam surface 66A from the center axis of the pipe portion 33 is varied such that the feeling of click motion is produced at suitable positions on the cam surface 66A when the side door 12 is opened of closed.

As shown in FIG. 8, the roller 64 is resiliently urged by the torsion bar 62 against the cam surface 66A of the cam plate 66 to be brought into line-to-line contact therewith all the time.

Further, the roller 64 is provided at the top and bottom portions thereof with collars 64A which clamp therebetween the cam plate 66 from above and below to being the cam plate 66 into rotating contact therewith, so that the cam plate 66 can be positioned in the vertical direction.

A circumferential grease groove 64C is formed on the inner periphery of a rotatable contacting portion 64B formed between the collars 64A of the roller 64, and heat-resistant grease is filled in the grease groove 64C, so that the durability of the roller 64 can be increased.

A wire harness 70 of the door, for an electrically driven window regulator and the like, not shown, of the side door 12, is extended in a generally S-shape from a harness hole 72 fromed on the front pillar 18, being diverted downwardly, to a harness hole 74 formed on the end panel 14 of the side door 12.

Here, the wire harness 70 extends along the side surface of the pipe portion 33 of the main arm 32, which is opposed to the side door 12, and further, passes through a V-shaped portion defined by the top and the bottom control arms 30A and 30B of the main arm 32.

The wire harness 70 is fixed to a harness clamp bracket 78 projecting from the body side base 20 through a harness clamp 76 at a position close to the pipe portion 33. The harness clamp 76 is made of resin, holds the wire harness 20 with the ring-shaped portion 76A and is inserted and fixed into a mounting hole 78A formed at the forward end position of the harness clamp bracket 78 with its forward end portion 76B.

A harness protector 80 made of resin is mounted at a position where the pipe portion 33 of the main arm 32 is adjacent to the wire harness 70, i.e. in a space in the vertical direction between connecting portions of the top arm 38A and of the bottom arm 38B to the pipe portion 33, so that peel-off of a coating on the pipe portion 33 due to the contact of the wire harness 70 with the pipe portion 33 can be avoided.

As shown in FIG. 4, the harness protector 80 is a generally cylindrical member capable of flaring by a slit 80C vertically sectioning the harness protector 80, and formed at the top end and the bottom end with cutouts 80A and 80B, respectively.

On the other hand, the pipe portion 33 is provided at positions opposed to the cutouts 80A, 80B of the harness protector 80 and the slit 80C with projections 82A, 82B and 82C, whereby, when the harness protector 80 is resiliently coupled onto the pipe portion 33A, the cutouts 80A, 80B and the slit 80C are engaged with these projections 82A-82C, so that the harness protector 80 can be positioned.

The door side base 16 and the body side base 20 are tightened and fixed to the end panel 14 of the side door 12 and the surface 18A of the front pillar 18 through bolts, respectively. A surface 90 of the door side base 16, opposed to the end panel 14 is constituted by mounting surfaces 90A being brought into contact with the end panel 14 and float-up surfaces 90B being not in contact with the end panel 14.

As shown in FIGS. 9 to 12, the mounting surfaces 90A extend only around the top and bottom bolt holes 16A and 16B, and other portion are formed into the float-up surfaces 90B.

Furthermore, as shown in FIGS. 13 to 16, a surface 92 of the body side base 20, opposed to the surface 18A of the front pillar 18 is constituted by mounting surfaces 92A contacting the surface 18A and float-up surfaces 92B not contacting thereto.

Figure 11:
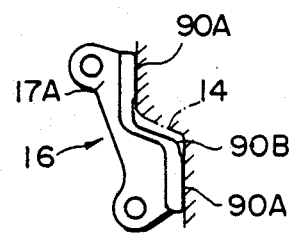
Figure 12:
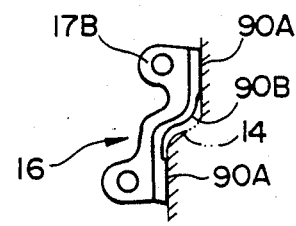
Figure 15:
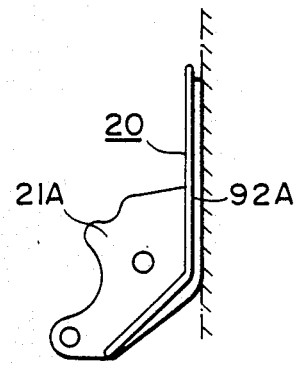
Figure 16:
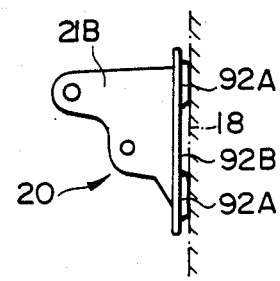

As hatchedly shown in FIG. 11, the mounting surfaces 92A are formed only around the top and bottom bolt holes 20A, 20B, the intermediate bolt hole 20C and the portions interconnecting these bolt holes, and portions other than the above are formed into the float-up surfaces 92B.

Description will hereunder be given of action of the above-described embodiment.

When the side door 12 is fully closed, at the raised portion 12D of the corner portion on the side of the compartment 84 of the end panel 14 of the side door 12, the weather strip 88 supported by the weather strip mount 86 is compressed in the widthwise direction of the vehicle body by the weather strip contact surface 18B on the side of the front pillar 18 so as to seal the space formed between the side door 12 and the vehicle body.

Here, the position of the rear end surface 18C of the front pillar 18 in the longitudinal direction is shifted forward as compared with the conventional case, as opposed to the position of the weather strip mount 86 in the longitudinal direction, thus improving the getting in and out properties of the vehicle for the occupant.

When the side door 12 is opened from the fully closed state, the main arm 32 rocks about the top rotary center shaft 28A and the bottom rotary center shaft 28B in the counterclockwise direction in FIG. 3. The top control arm 30A rocks about the top rotary center shaft 26A, and the bottom control arm 30B rocks about the bottom rotary center shaft 26B in the counterclockwise direction in FIG. 3, respectively.

Since the main arm 32, the top control arm 30A and the bottom control arm 30B constitute a quadric roatary link mechanism, the instantaneous rotary center of the side door 12 is progressively changed in position, and slides forwardly, while the side door 12 opens sideways.

At this time, since the rear end portion 11A of the front side fender 11 is located at a position more forwardly than the top rotary center shaft 26A disposed at the foremost position, as opposed to the forward end of the extension 12C of the side door 12, the top and the bottom control arms 30A and 30B can avoid interfering with the rear end portion 11A of the front side fender 11 when the side door 12 is fully opened even if the top and the bottom control arms 30A and 30B are of almost straight-lined shape, being slightly curved.

Further, since the top rotary center shafts 22A, 24A, 26A and 28A and the bottom rotary center shafts 22B, 24B, 26B and 28B are aligned on the inclined axes intersecting downwardly at one point 10A, the side door 12 fully opened has the top end inclined outwardly, so that an occupant can easily get on or off the vehicle.

Figure 17:
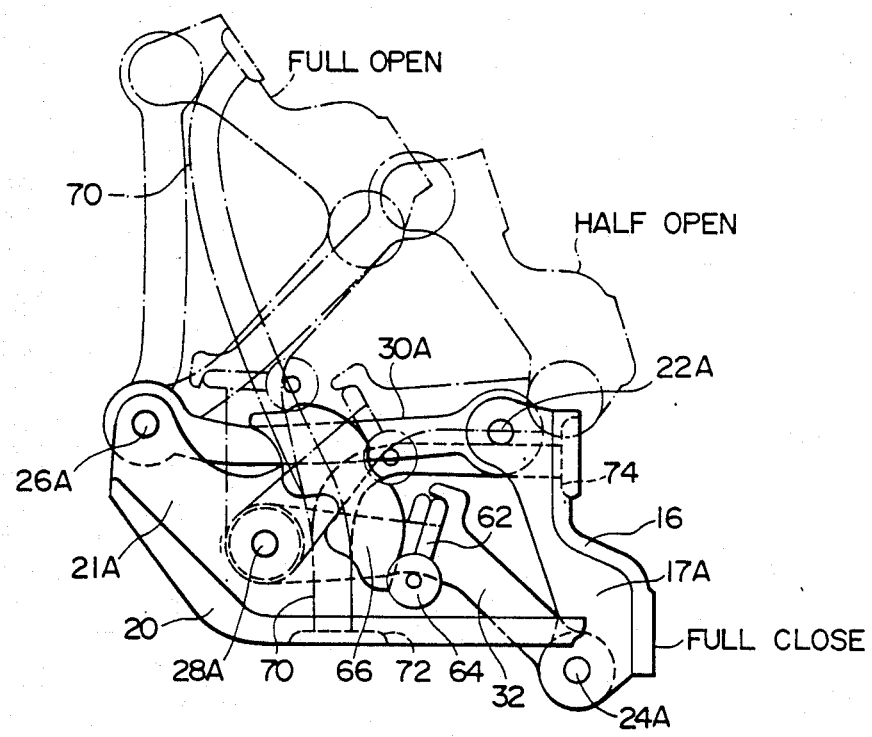
FIG. 17 is a plan view showing the opened and closed states of the side door in the side door hinge in the above embodiment.

As the side door 12 opens or closes, the roller 64 rotatably mounted to the torsion bar 62 in the door check mechanism 60 is brought into rotating contact with the cam surface 66A of the cam plate 66 as the side door 12 rocks (Refer to FIG. 17).

The torsion bar 62 supporting the roller 64 is wound at the wind-in form portion 62A thereof around the torsion bar hook 58. Furthermore, the top end of the torsion bar 62 is formed into the crank-shaped portion 62B, whereby the torsion bar 62 receives a trosional force from the cam surface 66A of the cam plate 66 in accordance with the rocking in the opening direction of the side door 12.

In consequence, as being subjected to a reaction force of the torsional force, the roller 64 is urged against the cam surface 66A of the cam plate 66.

In the cam surface 66A of the cam plate 66, the distance from the top rotary center shaft 28A is suitably varied, whereby the torsional force applied to the torsion bar is varied in accordance with the change in the lift value of the cam surface 66A.

In consequence, the feeling of click motion is produced during the opening or closing operation of the side door 12.

When the side door 12 comes to the fully opened position, the stoppers 52A and 52B which projected from the pipe portion 33 of the main arm 32 abut against the stopper surfaces 54A and 54B of the protrusions 56A and 56B which are provided on the body side base 20, so that the fully opened position can be regulated.

While extending from the end panel 14 of the side door 12 to the surface 18A of the front pillar 18 through the side door hinge 10, the wire harness 70 is disposed in the generally S-shape. Since the wire harness 70 is held by the harness clamp bracket 78 on the side of the body side base 20 through the harness clamp 76 at the position close to the pipe portion 33, the wire harness 70 is rocked about the harness clamp 76 during the opening or closing of the side door 12. Since the main arm 32 is formed into the generally K-shape and the wire harness 70 passes through the V-shape portion where the top arm 38A and the bottom arm 38B intersect each other, the wire harness 70 can avoid being clamped between the main arm 32, the door side base 16 or the body side base 20 during the opening or closing of the side door 12 as shown in FIG. 17.

The wire harness 70 is disposed adjacent the inner side of the pipe portion 33 of the main arm 32. This pipe portion 33 is resiliently coupled at the projections 82A-82C into the harness protector 80 and capable of contacting the wire harness 70 through the harness protector 80, so that the coating on the pipe portion 33 can avoid being peeled off and the wire harness 70 can be prevented from being damaged due to the contact of the wire harness 70 with the pipe portion 33.

In the above-described embodiment, the side door hinge 10 is constructed such that there are provided the four top rotary center shafts 22A, 24A, 26A and 28A, and the four botttom rotary center shafts 22A, 24B, 26B and 28B, which are spaced apart from each other in the vertical direction, these rotary center shafts are supported by one door side base 16 and one body side base 20 which are long in the vertical direction, the main arm 32 mainly supporting the weight of the side door 12 is formed integrally in the vertical direction and the top control arm 30A and the bottom control arm 30B are formed into thin shafts which are provided separetely of the main arm 32, so that the rigidity sufficient for supporting the side door 12 can be obtained without considerably increasing the weight of the side door hinge 10 and the weight of the side door 12, and the works of mounting the side door hinge 10 to the side door 12 and the front pillar 18A and of adjusting the mounting can be made very easy.

The main arm 32 formed integrally in the vertical direction is disposed inwardly of the top control arm 30A and the bottom control arm 30B in the widthwise direction of the vehicle body, whereby the main arm 32 can be disposed at the center of gravity of the side door 12 in the widthwise direction of the vehicle body, so that the load of the side door 12 acting on the side door hinge 10 can be ideally distributed.

From this, the side door hinge 10 itself has no waste in its weight, so that the maximum rigidity can be obtained by the minimum weight.

Particularly, the main arm 32 is intergral in the vertical direction, and more over, provided with the large-diameter pipe portion 33 which is coupled to the top rotary center shaft 28A and the bottom rotary center shaft 28B, so that the rigidity thereof can be increased to a considerable extent without greatly increasing the weight of the main arm 32 as a whole. Here, the pipe portion 33 mainly bears the torsional load, the top arm 38A and the bottom arm 38B, particularly, the top arm 38A bears the load of the side door 12.

The main arm 32 is formed into a generally chevron-shape being convexed outwardly in the widthwise direction of the vehicle body when the side door 12 is fully closed, and provided along the shape of the surface 18A of the front pillar 18 on the outboard side in the widthwise direction of the vehicle body, so that the main arm 32 can be received in the space 34 in the good efficiency of space without interfering the front pillar 18.

On the other hand, the top and the bottom control arms 30A and 30B are of generally straight-lined shape merely bent in a manner to be slightly convexed inwardly in the widthwise direction of the vehicle body. However, since the rear end portion 11A of the front fender 11 is positioned forwardly of the top rotary center shaft 28A, as opposed to the extension 12C of the side door 12, the side door 12 can slide as forwardly as possible when the side door 12 is fully opened as shown in FIG. 2 with no interference with the rear end portion 11A of the fender 11.

Further, in the state of full closing of the side door, the curves of the top and the bottom control arms 30A and 30B are slight, so that the distance of the space 34 in the widthwise direction of the vehicle body can be made small with no interference of these control arms with the front pillar 18 and the like.

Furthermore, the extension 12C of the side door 12 is formed into the thick width portion 12D expanded inwardly in the direction of the door thickness within the scope of not interfering with the top and the bottom control arms 30A and 30B, so that the extension 12C can be increased in its mechanical strength with high spatial efficiency without sacrificing the size of the side door hinge 10.

In the wire harness 70, the harness hole 72 on the side of the front pillar 18 is offset in the vertical direction relative to the harness hole 74 on the side of the end panel 14 of the side door 12, so that the torsional force of the wire harness 70, generated during the opening or closing of the side door 12 can be advantageously absorbed by the offset.

The bolt holes 16A and 16B in the door side base 16 and the bolt holes 20A and 20B in the body side base 20 are formed at the top and bottom ends thereof, respectively, and the bearing supporting portions 17A, 17B and 21A, 21B for supporting the rotary center shafts of the quadric rotary link mechanism are formed at positions close to the bolt holes 16A, 16B, 20A and 20B, whereby the side door hinge 10 can be formed as long as possible in the vertical direction, so that the rigidity of the side door hinge 10 can be increased and the load of the side door 12 can be effectively distributed.

The bolt holes and the bearing supporting portions are disposed close to each other, so that the door side base 16 and the body side base 20 can avoid being acted thereon with an excessively concentrated load.

Further, in the surfaces 90 and 92 of the door side base 16 and the body side base 20, which are opposed to the end panel 14 and the front pillar 18, respectively, only the portions around the bolt holes 16A, 16B, 20A, 20B and 20C are made to be the mounting surfaces 90A and 92A which contact the end panel 14 or the surface 18A of the front pillar 18, and portions other than the above are made to be the float-up surfaces 90B and 92B of non-contact, so that, when the motor vehicle enters a coating process with the side door 12 being mounted to the motor vehicle through the door hinge 10, the coating material can easily get into spaces fromed between the surface of the end panel 14 of the side door 12 and the door side base 16 and between the surface 18A of the front pillar 18 and the body side base 20.

When heating in applied to the motor vehicle is a drying furnace, the contact surfaces between the door side base 16 and the end panel 14 and the between the body side base 20 and the front pillar 18 are small in area, whereby heat increase on the end panel 14 and the surface 18A is not hampered so much, so that insufficient drying can be controlled.

In the above-described embodiment, the stoppers 52A and 52B for regulating the fully opened position of the side door 12 are formed at the top and bottom ends of the pipe portion 33 of the main arm 32, i.e. at the positions close to the bolt holes 20A, 20B and 20C of the body side base 20, so that the trends that the stoppers 52A and 52B tend to be deformed relative to the portions where the body side base 20 is mounted to the body can be controlled.

Further, the protrusions 56A and 56B forming the stopper surfaces 54A and 54B which abut against the stoppers 52A and 52B are provided in the corner portions between the inner surface of the body side base 20 and the pair of the top and bottom bearing supporting portions 21A and 21B, so that the impact forces generated by the abutting against the stoppers 52A and 52B can be reliably borne.

The door check mechanism 60 is in the above-described embodiment is constituted by the torsion bar 62, roller 64 and cam plate 66 as described above, whereby no operation failure is caused due to the adhesion of the coating, and the atmosphere of high temperature in the coating drying furnace can be borne as compared with the conventional door check mechanism, so that the side door hinge 10 can be assembled prior to the coating.

The conventional door check mechanism has been mounted to a portion into which sand, mud and the like intrude not easily, whereas, in the above-described embodiment, the door check mechanism is mounted into the space 34 into which water, sand, mud and the like can comparatively easily intrude. The door check mechanism 60 in this embodiment is advantageous in that the door check mechanism is not affected much by the adhesion of water, and or mud.

Particularly, even if sand, dust or the like adheres between the roller 64 and the cam surface 66A which constitute the door checking force, the bite-in of sand, dust or the like does not prevent the rotating contact of the roller 64 with the cam surface 66A, so that the opening-closing operational force of the side door 12 is not increased and troubles do not occur.

In particular, the grease groove 64C is formed on the inner surface of the roller 64 and the heat-resistant grease is filled in the groove, so that smooth rotation of the roller 64 can be maintained and the roller can be passed through the coating drying furnace with the grease being filled therein.

The roller 64 is axially slidably mounted to the crank-shaped portion 62B of the torsion bar 62, whereby assembling errors and manufacturing errors of the the torsion bar hook 58 to which the torsion bar 62 is secured on the side of the main arm 32, the cam plate 66 secured to the bearing supporting portion 21A on the side of the body side base 20 and the torsion bar 62 are absorbed, so that the roller 64 can be brought into contact with the cam surface 66A of the cam plate 66.

Particularly, the roller 64 is provided at the top and bottom thereof with the pair of collars 64A so as to clamp the cam plate 66 from above and below, so that the rotating contact of the roller 64 with the cam surface 66A can be reliably maintained.

The cam plate 66 is the flat plate-shaped member mounted onto the bearing supporting portion 21A perpendicularly intersecting the top rotary center shaft 28A, the cam surface 66A thereof can be readily formed in parallel to the top rotary center shaft 28A, i.e. the rotary center axis of the pipe portion 33 of the main arm 32.

In consequence, during the opening or closing of the side door 12, the roller 64 can slide on the cam surface 66A under a constant condition all the time, whereby the both members are not inclined or twisted with each other.

The pipe portion 33 of the main arm 32 is hollow, so that the rigidity of the main arm 32 can be increased to a considerable extent without greatly increasing the weight threrof. Further, the top rotary center shaft 28A and the bottom rotary center shaft 28B are formed separately of each other and inserted into the coupling holes 33A and 33B which are formed at the top end and the bottom end of the pipe member 33, so that the weight reducing and the assembling properties can be improved as compared with the case where a rotary center shaft formed integrally in the vertical direction is adopted.

In the above-described embodiment, the forward end corner portion of the inner panel 12A of the door 12 on the side of the compartment 84 side is projected forward to form the weather strip mount 86, to which the door weather strip is secured, and the rear end face 18C of the front pillar 18 on the side of the vehicle body is opposed to the weather strip mount 86 to form the weather strip abutting surface 18B, which abuts against the door werather strip 88 in the widthwise direction of the vehicle body, so that the space 34 where the side door hinge 10 is disposed can be made small and the rear end face 18C of the front pillar 18 can be shifted more forwardly than the normal case to improve the properties of getting in or out of the vehicle by the occupant.

Further, such a sealing mechanism can be adapted which is suited to the opening or closing locus of the side door 12 in the side door hinge 10 utilizing the quadric rotary link mechanism, so that the sealing during the full closing of the side door 12 can be reliably achieved.

Additionally, in the above-described embodiment, the main arm 32 formed integrally in the vertical direction has been formed into the generally K-shape including the pipe portion 33, the top arm 38A and the bottom arm 38B, however, the present invention need not necessarily be limited to this, and the main arm 32 may be formed integrally in the vertical direction and rotatably supported by the top rotary center shafts 24A, 28A and the bottom rotary center shafts 24B, 28B.

In consequence, for example, a pipe portion may be provided which is coupled to the top rotary center shaft 24A and the bottom rotary center shaft 24B and the main arm 32 may be frame-shaped.

However, when the main arm 32 is formed into a generally K-shape in the embodiment shown in FIG. 1, such advantages may be offered that interference thereof with the wire harness 76 is avoided and the weight thereof is decreased.

Furthermore, in the above embodiment, the cam plate 66 in the door check mechanism 60 is of a flat plate shape and secured to the bearing supporting portion 21A at the upper portion of the body side base 20, whereby the cam surface 66A comes to be in parallel to the rotary center axis of the pipe portion 33 of the main arm 32, however, in this case, regardless of the shape of the cam plate 66, the cam surface 66A may be in parallel to the rotary center axis of the pipe portion 33. In consequence, the cam plate 66 need not necessarily be of the flat plate shape.

Furthermore, the cam surface 66A may be directly formed on the top bearing supporting portion 21A itself for example.

Figure 18:
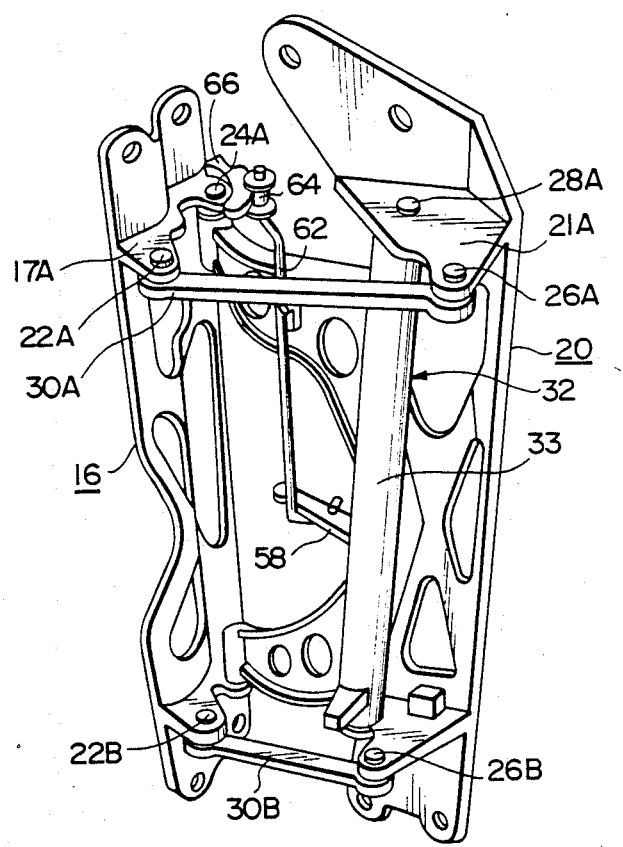
FIGS. 18 and 19 are perspective views showing other embodiments of the door check mechanism according to the present invention.
Figure 19:
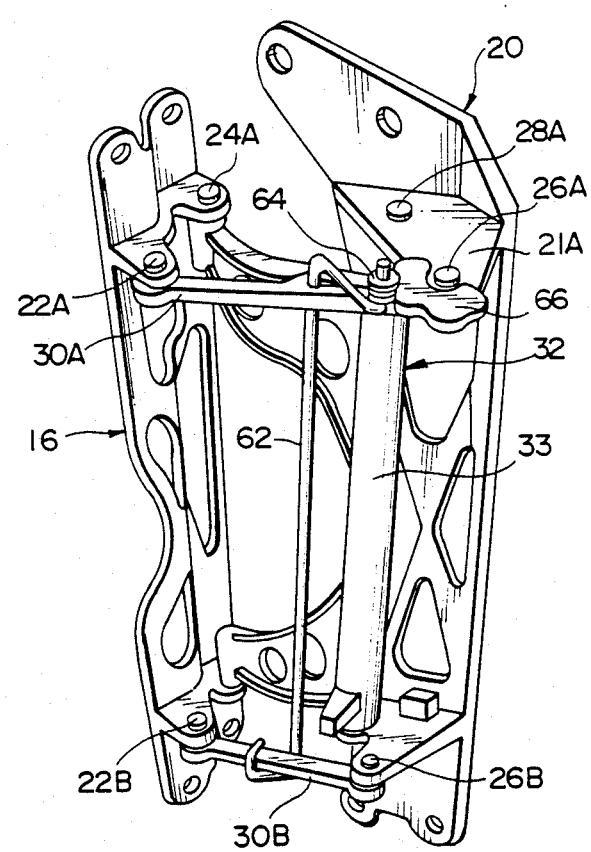

As shown in FIG. 18, the cam plate 66 may be provided on the bearing supporting portion 17A at the upper portion of the door side base 16, and further, as shown in FIG. 19, the torsion bar 62 may be secured to the top control arm 30A and the bottom control arm 30B, and the cam plate 22 may be secured to the bearing supporting portion 21A, being centered about the top rotary center shafts 26A on the side of the vehicle body.

Furthermore, in the above embodiment, the arms constituting the quadric rotary link devices have been mounted to the side door 12 and the front pillar 18 through the door side base 16 and the body side base 20, respectively, however, the present invention need not necessarily be limited to this, and is applicable to the case where these arms are rotatably and directly mounted to the side door 12 and the vehicle body.

What is claimed is:

1. A construction of a body of motor vehicle, having a side door hinge mechanism comprising:
   rotary center shafts on a side door, supported at two positions spaced apart from each other in the generally horizontal direction on an end panel on the a rocking proximal end of the side door;
   rotary center shafts on a vehicle body, supported at two positions spaced apart from each other in the generally horizontal direction on a surface on the vehicle body, adjacent said end panel;
   a first arm rotatably connected at opposite ends thereof to one of the rotary center shafts on the vehicle body and one of the rotary center shafts on the side door; and
   a second arm rotatably connected at opposite ends thereof to rotary center shafts on the vehicle body and to rotary center shafts on the side door; wherein
   a forward end corner portion of said end panel of the side door on the inboard side is raised more forwardly on the vehicle body than the rear end of a surface of the end panel, where a side door hinge is secured, to thereby provide a raised portion;
   said raised portion is secured thereto with a weather strip, with which a weather strip contact surface on the side of the vehicle body comes into pressing contact in the widthwise direction of the vehicle body when the side door is fully closed.

2. A construction of a body of motor vehicle as set forth in claim 1, wherein said weather strip contact surface on the side of the vehicle body and the rear end of an opening portion on the side of the vehicle body contiguous to said contact surface are shifted forwardly in the vehicle body relative to the position of said raised portion of the side door.

3. A construction of a body of motor vehicle as set forth in claim 1, wherein said weather strip contact surface is formed on an outside surface of a front pillar at a rear end thereof.

4. A construction of a body of motor vehicle as set forth in claim 2, wherein said weather strip contact surface is formed on an outside surface of a front pillar at a rear end thereof.

5. A construction of a body of motor vehicle as set forth in claim 3, wherein said weather strip contact surface is formed on a recess at an outside and rearside corner of the front pillar.

6. A construction of a body of motor vehicle as set forth in claim 4, wherein said weather strip contact surface is formed on a recess at an outside and rearside corner of the front pillar.

7. A construction of a body of motor vehicle as set forth in claim 1, wherein an inner panel and an outer panel in the side door are extended along the outer surface of the side door, further forwardly from the end panel, to thereby form an extension, the extension is extended forwardly in a manner not interfering with a front side fender when the door is opened, the forward end of the extension in the longitudinal direction of the vehicle body is disposed outwardly of the rotary center shaft on the side of the vehicle body located at the foremost position, and positioned close to the forward end of the front pillar, whereby a space for receiving the side door hinge is formed between the outer surface of the front pillar and the extension.

8. A construction of a body of motor vehicle as set forth in claim 2, wherein an inner panel and an outer panel in the side door are extended along the outer surface of the side door, further forwardly from the end panel, to thereby form an extension, the extension is extended forwardly in a manner not interfering with a front side fender when the door is opened, the forward end of the extension in the longitudinal direction of the vehicle body is disposed outwardly of the rotary center shaft on the side of the vehicle body located at the foremost position, and positioned close to the forward end of the front pillar, whereby a space for receiving the side door hinge is formed between the outer surface of the front pillar and the extension.

9. A construction of a body of motor vehicle as set forth in claim 3, wherein an inner panel and an outer panel in the side door are extended along the outer surface of the side door, further forwardly from the end panel, to thereby form an extension, the extension is extended forwardly in a manner not interfering with a front side fender when the door is opened, the forward end of the extension in the longitudinal direction of the vehicle body is disposed outwardly of the rotary center shaft on the side of the vehicle body located at the foremost position, and positioned close to the forward end of the front pillar, whereby a space for receiving the side door hinge is formed between the outer surface of the front pillar and the extension.

10. A construction of a body of motor vehicle as set forth in claim 4, wherein an inner panel and an outer panel in the side door are extended along the outer surface of the side door, further forwardly from the end panel, to thereby form an extension, the extension is extended forwardly in a manner not interfering with a front side fender when the door is opened, the forward end of the extension in the longitudinal direction of the vehicle body is disposed outwardly of the rotary center shaft on the side of the vehicle body located at the foremost position, and positioned close to the forward end of the front pillar, whereby a space for receiving the side door hinge is formed between the outer surface of the front pillar and the extension.

11. A construction of a body of motor vehicle as set forth in claim 5, wherein an inner panel and an outer panel in the side door are extended along the outer surface of the side door, further forwardly from the end panel, to thereby form an extension, the extension is extended forwardly in a manner not interfering with a front side fender when the door is opened, the forward end of the extension in the longitudinal direction of the vehicle body is disposed outwardly of the rotary center shaft on the side of the vehicle body located at the foremost position, and positioned close to the forward end of the front pillar, whereby a space for receiving the side door hinge is formed between the outer surface of the front pillar and the extension.

12. A construction of a body of motor vehicle as set forth in claim 6, wherein an inner panel and an outer panel in the side door are extended along the outer surface of the side door, further forwardly from the end panel, to thereby form an extension, the extension is extended forwardly in a manner not interfering with a front side fender when the door is opened, the forward end of the extension in the longitudinal direction of the vehicle body is disposed outwardly of the rotary center shaft on the side of the vehicle body located at the foremost position, and positioned close to the forward end of the front pillar, whereby a space for receiving the side door hinge is formed between the outer surface of the front pillar and the extension.

13. A construction of a body of motor vehicle as set forth in claim 1, wherein said weather strip is secured to a weather strip mount which is generally L-shaped at the raised portion.

14. A construction of a body of motor vehicle as set forth in claim 2, wherein said weather strip is secured to a weather strip mount which is generally L-shaped at the raised portion.

15. A construction of a body of motor vehicle as set forth in claim 3, wherein said weather strip is secured to a weather strip mount which is generally L-shaped at the raised portion.

16. A construction of a body of motor vehicle as set forth in claim 4, wherein said weather strip is secured to a weather strip mount which is generally L-shaped at the raised portion.

17. A construction of a body of motor vehicle as set forth in claim 5, wherein said weather strip is secured to a weather strip mount which is generally L-shaped at the raised portion.

18. A construction of a body of motor vehicle as set forth in claim 6, wherein said weather strip is secured to a weather strip mount which is generally L-shaped at the raised portion.

19. A construction of a body of motor vehicle as set forth in claim 7, wherein said weather strip is secured to a weather strip mount which is generally L-shaped at the raised portion.

20. A construction of a body of motor vehicle as set forth in claim 8, wherein said weather strip is secured to a weather strip mount which is generally L-shaped at the raised portion.

* * * * *